United States Patent
Gubitz

[15] 3,697,505
[45] Oct. 10, 1972

[54] AROMATIC SUBSTITUTED AMIDINES

[72] Inventor: Franklyn W. Gubitz, Nassau, N.Y.

[73] Assignee: Sterling Drug Inc., New York, N.Y.

[22] Filed: Feb. 3, 1969

[21] Appl. No.: 796,187

[52] U.S. Cl. ......260/239 B, 260/247.1, 260/247.5 R, 260/268 R, 260/268 PH, 260/268 BZ, 260/293.69, 260/293.73, 260/293.78, 260/293.79, 260/295 R, 260/295 AM, 260/295.5 A, 260/296 R, 260/326.3, 260/326.5 S, 260/326.5 SF, 260/326.5 J, 260/326.82, 260/326.86, 260/558 R, 260/558 S, 260/558 D, 260/559 R, 260/564 R, 260/566 D, 424/244, 424/248, 424/250, 424/263, 424/267, 424/326

[51] Int. Cl.....C07d 27/06, C07d 29/16, C07d 41/04

[58] Field of Search.........260/239 B, 239 BE, 564 R, 293.73, 260/295 R, 293.78, 296 R, 326.3, 326.5 S, 326.5 SF, 326.5 L, 293.69, 293.79

[56] References Cited

UNITED STATES PATENTS 3,125,573  3/1964  Elpern......................260/564
2,211,280  8/1940  Martin et al..............260/564

*Primary Examiner*—Alton D. Rollins
*Attorney*—Elmer J. Lawson, B. Woodrow Wyatt, Thomas L. Johnson, Robert K. Bair, R. Clifford Bourgeois, William G. Webb and Roger T. Wolfe

[57] ABSTRACT

Substituted amidines of the formula $Ar(CH_2)_nC(N=Z)=NR$ where Ar is pyridyl, phenyl or substituted phenyl, n is O or an integer from 1 to 3, N=Z is tertiary-amino and R is lower-alkyl, lower-alkenyl or substituted lower-alkyl, having diuretic and anti-inflammatory activity, are prepared by interacting an amide of the formula $Ar(CH_2)_nCONHR$ with phosphorus pentachloride, and interacting the resulting imidyl chloride, $Ar(CH_2)_nC(Cl)=NR$ with a secondary-amine, HN=Z.

5 Claims, No Drawings

AROMATIC SUBSTITUTED AMIDINES

This invention relates to aromatic substituted amidines, and more particularly is concerned with amidines completely substituted on the nitrogen atoms, and substituted on the carbon atom by monocarbocyclic aryl or pyridyl groups, and with methods for their preparation.

The compounds of the invention are represented by the following structural formula

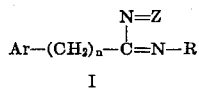

wherein Ar is pyridyl, phenyl or phenyl substituted by from one to three substituents selected from the group consisting of halogen, trifluoromethyl, trifluoromethoxy, nitro, lower-alkyl, lower-alkoxy, lower-alkylthio, lower-alkylsulfoxy, lower-alkyl-sulfonyl and amino; $n$ is 0 or an integer from 1 to 3; N=Z is a basic tertiary-amino group having a molecular weight less than about 200; and R is lower-alkyl, lower-alkenyl, cycloalkyl of 3–6 ring members, cycloalkyl-lower-alkyl wherein cycloalkyl has 3–6 ring members, phenyl-lower-alkyl, hydroxy-lower-alkyl or lower-alkanoyloxy-lower-alkyl.

In the foregoing definitions the terms lower-alkyl, lower-alkoxy, lower-alkenyl and lower-alkanoyloxy refer to such groups having up to six carbon atoms and which can have straight or branched chains.

In the above formula I, N=Z stands for a basic tertiary-amino group having a molecular weight less than about 200.

The term "tertiary-amino" defines radicals of the type –NNT' wherein T and T' are organic radicals, so that the complete molecule containing the radical –NTT' is a tertiary-amine. Basic tertiary-amino radicals are those of the aliphatic or araliphatic type that impart to the molecules which contain them sufficient basicity (ionization to the extent of at least 10⁻⁶) so that the compounds readily form acid-addition salts with strong inorganic and organic acids. A particularly preferred group of tertiary-amino radicals are di-lower-alkylamio, for example, dimethylamino, diethylamino, dibutylamino, methylethylamino, and the like; dicycloalkylamino in which the cycloalkyl has from five to six ring members and a total of from five to about nine carbon atoms, for example, dicyclopentylamino, dicyclohexylamino, bis(4-methylcyclohexyl)amino, and the like; N-(cycloalkyl)-lower-alkylamino in which the cycloalkyl has from five to six ring members and a total of from five to about nine carbon atoms, for example, N-(cyclohexyl)methylamino, N-(cyclopentyl)ethylamino, and the like; polymethylenimino having from five to nine ring members and a total of from five to about twelve carbon atoms, for example, 1-pyrrolidyl, 1-piperidyl, hexamethylenimino, heptamethylenimino, octamethylenimino and lower-alkylated derivatives thereof; polymethylenimino having from five to nine ring members substituted on a ring carbon atom non-adjacent to nitrogen by hydroxy, lower-alkanoyloxy or oxo; 4-morpholinyl and lower-alkylated derivatives thereof; 1-piperazinyl and lower-alkylated derivatives thereof; 4-hydrocarbon-substituted-1-piperazinyl in which the hydrocarbon substituent has from 1 to 10 carbon atoms, for example, 4-methyl-1-piperazinyl, 4-phenyl-1-piperazinyl, and the like; di-(phenyl-lower-alkyl)amino, for example, dibenzylamino, bis(phenylethyl)-amino, and the like; and N-(phenyl-lower-alkyl)-lower-alkylamino, for example, N-(benzyl)methylamino, N-(phenylethyl)ethylamino, and the like. In the foregoing radicals, the term lower-alkyl stands for alkyl groups containing from one to about six carbon atoms.

A particularly preferred class of basic tertiary-amino groups (N=Z) consists of polymethylenimino having from 5 to 9 ring members and such groups substituted on a ring carbon atom non-adjacent to nitrogen by hydroxy, lower-alkanoyloxy or oxo.

The compounds of formula I are prepared by the following reaction scheme:

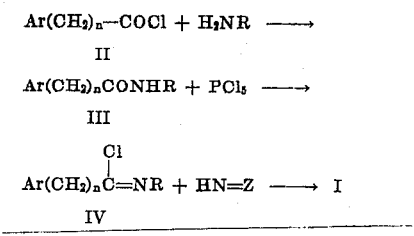

An acid chloride of formula II is treated with a primary-amine, H₂NR, to produce the amide of formula III. The amide III is then treated in an inert solvent with phosphorus pentachloride to produce the imidyl chloride of formula IV. The reaction takes place at a temperature between about 50° and 150° C., conveniently at the reflux temperature of the inert solvent. The phosphorus pentachloride can be replaced by thionyl chloride if desired. The final step comprises treating the imidyl chloride IV with a secondary-amine, HN=Z, in an inert solvent. The reaction takes place at a temperature between about 20° and 150°C.

The compounds of formula I wherein $n$ is 1–3 can be prepared by an alternative route as follows:

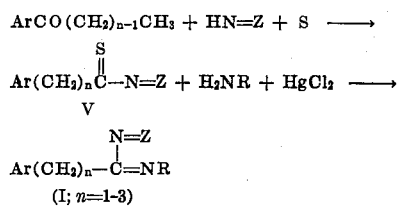

An aryl lower-alkyl ketone heated with a secondary amine, HN=Z, and sulfur gives a thioamide of formula V. The latter is then interacted with a primary-amine, H₂NR, in the presence of mercuric chloride to give a compound of formula I wherein $n$ is 1–3.

The compounds of the invention of formula I are basic in nature and readily form acid-addition or quaternary ammonium salts. Said acid-addition and quaternary ammonium slats are within the purview of the invention and are the full equivalents of the free bases claimed herein.

It will thus be appreciated that formula I not only represents the structural configuration of the bases of formula I but is also representative of the respective structural entity which is common to all of the respective compounds of formula I whether in the form of the free bases or in the form of the acid-addition or quaternary ammonium salts of the bases. By virtue of this common structural entity, the bases and their salts have inherent biological activity of a type to be more fully described hereinbelow. When used for pharmaceutical purposes one can employ the free bases themselves or the acid-addition or quaternary ammonium salts formed from pharmaceutically-acceptable acids or esters, that is, acids or esters whose anions are innocuous to the animal organism in effective doses of the salts so that beneficial properties inherent in the common structural entity represented by the free bases are not vitiated by side-effects ascribable to the anions.

In utilizing the pharmacodynamic activity of the salts of the invention, pharmaceutically-acceptable salts are preferred. Although water-insolubility, high toxicity, or lack of crystalline character may make some particular salt species unsuitable or less desirable for use as such in a given pharmaceutical application, the water-insoluble or toxic salts can be converted to any desired pharmaceutically-acceptable salt by double decomposition reactions involving the anion, for example, by ion-exchange procedures. Moreover, apart from their usefulness in pharmaceutical applications, the salts are useful as characterizing or identifying derivatives of the free bases or in isolation or purification procedures.

It will be appreciated from the foregoing that all of the acid-addition and quaternary ammonium salts of the new bases of the invention are useful and valuable compounds, regardless of considerations of solubility, toxicity, physical form, and the like, and are accordingly within the purview of the instant invention.

The novel feature of the compounds of the invention, then, resides in the concept of the bases and cationic forms of the basic compounds of formula I and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus, the acid-addition salts discussed above and claimed herein are prepared from any organic acid, inorganic acid (including organic acids having an inorganic group therein), or organo-metallic acid as exemplified by organic mono- and polycarboxylic acids. Illustrative acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, cyclohexanesulfamic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenyl-phosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the basic compounds of formula I are obtained by the addition of esters of strong acids to the free base form of the compounds, said esters having a molecular weight less than about 300. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological evaluation of the compounds of formula I has shown that they possess diuretic, natriuretic, and anti-inflammatory activity upon oral administration. These activities were demonstrated in dogs and rats by standard test procedures.

The diuretic and natriuretic activities in dogs were determined by the method of McKeon, Arch. int. Pharmacodyn. *151*, 225–42 (1964), whereby the effect of oral administration of the test compounds upon the volume and the sodium, potassium and chloride ion content of the urine was determined.

The diuretic and natriuretic activity in rats was determined according to the procedure of Williamson et al., J. Pharm. & Exptl. Therap. *126*, 82 (1959). The compound to be tested was administered orally. A control group of animals was treated with 8 micromoles/kg. of the standard drug, hydrochlorothiazide. The dose of the test compound which produced a response half that of the reference drug, hydrochlorothiazide, was then reported as the approximate minimal effective dose.

The anti-inflammatory activity was measured by the inhibition of carrageenin-induced local foot edema in rats according to the method of Winter et al., Proc. Soc. Exptl. Biol. & Med. *111*, 544 (1962), and by the inhibition of pleurisy in rats according to the method of Wilhelmi [Non-Steroidal Anti-inflammatory Drugs, Proceedings of an International Symposium, Milan, 1964. Excerpta Medica Foundation, Amsterdam].

In the carrageenin-induced edema inhibition tests, one hour following medication, 0.05 ml. of 1 percent aqueous suspension of carrageenin was injected into the planar tissue of their right hind foot and 0.05 ml. of saline similarly into the left foot. Three hours after injection, the rats were sacrificed and the hind feet cut off at the tibio-calcaeno-talar joint for subsequent weighing. The observed differences between the average edema weight of the control and medicated rats were expressed as percent inhibition of edema.

In the pleurisy inhibition tests, the degree of inhibition of pleural exudate formation induced by silver nitrate as an irritant in the medicated rats as compared with control rats was a measure of the anti-inflammatory activity.

The actual determination of the numerical biological data definitive for a particular compound is readily obtained by standard test procedures by technicians trained in pharmacological test procedures, without the need for any extensive experimentation. The compounds are effective in amounts of 5–50 micromoles per kilogram depending upon the compound used and the manner of administration. They are prepared for use by conventional phamaceutical formulation procedures, that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution, or oil-water emulsion) for parenteral administration.

The structures of the compounds of the invention were established by the modes of synthesis, by elementary analysis, and by infrared, ultraviolet and nuclear magnetic resonance spectral determinations.

The following examples will further illustrate the invention without the latter being limited thereby.

A. Benzamide Derivatives and Analogs

EXAMPLE A1

N-Allyl-4-chlorobenzamide [III; Ar is 4–$ClC_6H_4$, n is O, R is $CH=CH_2$]

A solution of 28.5 g. of allylamine in 250 ml. of chloroform was cooled in an ice bath. p-Chlorobenzoyl chloride (44 g.) was added dropwise with stirring. The reaction mixture was allowed to warm to room temperature and then stirred for 3 hours. The chloroform solution was washed with water and dilute hydrochloric acid, and dried over anhydrous calcium sulfate. The chloroform solution was concentrated in vacuo to remove the solvent, and the residue was crystallized from a cyclohexane-n-pentane mixture to give 37.94 g. of N-allyl-4-chlorobenzamide, m.p. 70°–72° C.

EXAMPLE A2

N-Cyclopropylmethyl-4-chlorobenzamide [III; Ar is 4-$ClC_6H_4$, n is O, R is $CH_2CH(CH_2)_2$]

A mixture of 14.86 g. of cyclopropylmethylamine, 16.6 g. of pyridine and 200 ml. of chloroform was cooled to −15° C. p-Chlorobenzoyl chloride (36.7 g.) was added dropwise, and the reaction mixture was allowed to warm to room temperature and stirred for three hours. The solution was washed successively with water, dilute hydrochloric acid, dilute sodium bicarbonate and water, dried over anhydrous calcium sulfate and concentrated in vacuo. The residue was crystallized from cyclohexane to give 32.5 g. of N-cyclopropylmethyl-4-chlorobenzamide, colorless blade clusters, m.p. 116°–118° C.

EXAMPLE A3

N-Ethyl-4-chlorobenzamide [III; Ar is 4$ClC_6H_4$, n is O, R is $CH_2CH_3$]

A solution of 17.7 g. of ethylamine in water was cooled to −5° C., and 17.5 g. of p-chlorobenzoyl chloride was added dropwise with stirring. The precipitate which formed was collected and dried to give N-ethyl-4-chlorobenzamide which was used directly to form the compound of Example B3 below.

EXAMPLE A4

N-(2-Hydroxyethyl)-4-chlorobenzamide [III; Ar is 4-$ClC_6H_4$, n is O, R is $CH_2CH_2OH$].

A mixture of 42.7 g. of methyl p-chlorobenzoate and 61.6 g. of ethanolamine was heated at reflux for three hours. The reaction mixture was poured into water, and the solid product collected by filtration and recrystallized from aqueous ethanol to give 30.5 g. of N-(2-hydroxyethyl)-4-chlorobenzamide, m.p. 108°–113° C.

The following compounds were prepared by the methods of Examples A1, A2 or A3, using the appropriate acid chloride, $Ar(CH_2)_nCOCl$, and amine, $H_2NR$:

Example A5: N-(n-Propyl)-chlorobenzamide [III; Ar is 4-$ClC_6H_4$, n is O, R is $CH_2CH_2CH_3$] (method A1), m.p. 96°–98 C. (prisms from ether-pentane).

Example A6: N-Allyl-4-fluorobenzamide [III; Ar is 4-$FC_6H_4$, n is 0, R is $CH_2CH=CH_2$] (method A1), m.p. 67°–69 C.

Example A7: N-Allyl-4-trifluoromethylbenzamide [III; Ar is 4-$F_3CC_6H_4$, n is 0, R is $CH_2CH=CH_2$] (method A1), pale yellow dendrite needles.

Example A8: N-Benzyl-4-chlorobenzamide [III; Ar is 4-$clC_6H_4$, n is 0, R is $CH_2C_6H_5$] (method A1), m.p. 164°–166° C. (fluffy needles).

Example A9: N-Cyclohexylmethyl-4-chlorobenzamide [III; Ar is 4-$clC_6H_4$, n is O, R is $CH_2CH(CH_2)_5$] (method A2), m.p. 117°–119° C. (needles from cyclohexane).

Example A10: N-(2-Butenyl)-4-chlorobenzamide [III; Ar is 4-ClC$_6$H$_4$, n is O, R is CH$_2$CH=CHCH$_3$] (method A2), m.p. 110°–112° C. (fragmented blades and needles from cyclohexane).

Example A11: N-(n-Butyl)-4-chlorobenzamide [III; Ar is 4-ClC$_6$H$_4$, n is O, R is CH$_2$CH$_2$CH$_2$CH$_3$] (method A1), m.p. 80°–82° C. (needles from cyclohexane).

Example A12: N-Isobutyl-4-chlorobenzamide [III; Ar is 4-ClC$_6$H$_4$, n is O, R is Ch$_2$CH(CH$_3$)$_2$] (method a1), m.p. 93°–95° C. (needles and platelets from cyclohexane).

Example A13: N-(2-Phenylethyl)-4-chlorobenzamide [III; Ar is 4-ClC$_6$H$_4$, n is O, R is CH$_2$CH$_2$C$_6$H$_5$] (method A1), m.p. 134°–136° C. (needles from cyclohexane).

Example A14: N-Cyclopropylmethyl-4-fluorobenzamide [III; Ar is 4-FC$_6$H$_4$, n is O, R is CH$_2$CH(CH$_2$)$_2$] (method A2), m.p. 87°–97° C. (needles from cyclohexane).

Example A15: N-Allylbenzamide [III; Ar is C$_6$H$_5$, n is O, R is CH$_2$CH=CH$_2$] (method A1), yellow oil.

Example A16: N-Allyl-4-bromobenzamide [III; Ar is 4-BrC$_6$H$_4$, n is O, R is CH$_2$CH=CH$_2$] (method A1), m.p. 92°–94 C.

Example A17: N-(2-Methylbutyl)-4-chlorobenzamide [III; Ar is 4-ClC$_6$H$_4$, n is O, R is CH$_2$CH(CH$_3$)CH$_2$CH$_3$] (method A1), m.p. 54°–64° C.

Example A18: N-(n-Propyl)benzamide [III; Ar is C$_6$H$_5$, n is O, R is CH$_2$CH$_2$CH$_3$] (method A1), m.p. 82°–84° C.

Example A19: N-(n-Propyl)-4-iodobenzamide [III; Ar is 4-IC$_6$H$_4$, n is O, R is CH$_2$CH$_2$CH$_3$] (method A1), m.p. 121°–123° C.

Example A20: N-Cyclopropylmethyl-4-iodobenzamide [III; Ar is 4-IC$_6$H$_4$, n is O, R is CH$_2$CH(CH$_2$)$_2$] (method A2), needles from ethyl acetate.

Example A21: N-Methyl-4-chlorobenzamide [III; Ar is 4-ClC$_6$H$_4$, n is O, R is CH$_3$] (method A3), m.p. 153°–155° C.

Example A22: N-(n-Propyl)-2,6-dichlorobenzamide [III; Ar is 2,6-Cl$_2$C$_6$H$_3$, n is O, R is CH$_2$CH$_2$CH$_3$] (method A1), m.p. 131°–133° C. (plates from ether).

Example A23: N-Isopropyl-4-chlorobenzamide [III; Ar is 4-ClC$_6$H$_4$, n is O, R is CH(CH$_3$)$_2$] (method A1), m.p. 142°–144° C. (needles from ethyl acetate).

Example A24: N-Cyclopropyl-4-chlorobenzamide [III; Ar is 4-ClC$_6$H$_4$, n is O, R is CH(CH$_2$)$_2$] (method A2), m.p. 132°–133° C. (needles from ethyl acetate-cyclohexane).

Example A25: N-Isopropylnicotinamide [III; Ar is 3-pyridyl, n is O, R is CH(CH$_3$)$_3$] (method A1), m.p. 92°–93 C. (from hexane).

Example A26: N-(n-Propyl)-4-nitrobenzamide [III; Ar is 4-O$_2$NC$_6$H$_4$, n is O, R is CH$_2$CH$_2$CH$_3$], m.p. 102°–103.5° C. (from benzene-pentane).

Example A27: N-(n-Propyl)-4-methoxybenzamide [III; Ar is 4-CH$_3$OC$_6$H$_4$, n is O, R is CH$_2$CH$_2$CH$_3$], m.p. 62°–64 C. (from benzene-pentane).

Example A28: N-Isopropyl-2-chlorobenzamide [III; Ar is 2-ClC$_6$H$_4$, n is O, R is CH(CH$_3$)$_2$] (method A1), m.p. 138°–140° C.

Example A29: N-(n-Propyl)-4-methylbenzamide [III; Ar is 4-CH$_3$C$_6$H$_4$, n is O, R is CH$_2$CH$_2$CH$_3$] (method A1), m.p. 66°–67° C.

Example A30: N-Isopropyl-3-chlorobenzamide [III; Ar is 3-ClC$_6$H$_4$, n is O, R is CH(CH$_3$)$_2$] (method A1), m.p. 87°–89 C.

Example A31: N-(n-Propyl)-3,4-dichlorobenzamide [III; Ar is 3,4-Cl$_2$C$_6$H$_3$, n is O, R is CH$_2$CH$_2$CH$_3$] (method A1), m.p. 60°–62° C.

Example A32: N-Isopropyl-3,4-dichlorobenzamide [III; Ar is 3,4Cl$_2$C$_6$H$_3$, n is O, R is CH(CH$_3$)$_2$] (method A1), m.p. 123°–125° C.

Example A33: N-(n-Propyl)-3-methoxy-4-chlorobenzamide [III; Ar is 3-CH$_3$-O-4-ClC$_6$H$_3$, n is O, R is CH$_2$CH$_2$CH$_3$] (method A1), colorless crystals.

Example A34: N-(n-propyl-3,5-dichlorobenzamide [III; Ar is 3,5-Cl$_2$C$_6$H$_3$, n is O, R is CH$_2$CH$_2$CH$_3$] (method A1), m.p. 203°–205° C.

Example A35: N-Isopropyl-2,4-dichlorobenzamide [III; Ar is 2,4-Cl$_2$C$_6$H$_3$, n O, R is CH(CH$_3$)$_2$] (method A1), m.p. 121°–130° C.

Example A36: N-(n-Propyl)-2,4-dichlorobenzamide [III; Ar is 2,4-Cl$_2$C$_6$H$_3$, n is O, R is CH$_2$CH$_2$CH$_3$] (method A1), m.p. 91°–94° C.

Example A37: N-Isopropyl-4-trifluoromethoxybenzamide [III; Ar is 4-F$_3$COC$_6$H$_4$, n is O, R is CH(CH$_3$)$_2$] (method A1), m.p. 100°–101° C.

Example A38: N-Isopropyl-3,5-dichlorobenzamide [III; Ar is 3,5-Cl$_2$C$_6$H$_3$, n is O, R is CH(CH$_3$)$_2$] (method A1), m.p. 158°–160° C. (needles from chloroform).

Example A39: N-(3-Hydroxypropyl)-4-chlorobenzamide [III; Ar is 4-ClC$_6$H$_4$, n is O, R is CH$_2$CH$_2$CH$_2$OH] (method A4), m.p. 105°–107° C. (colorless prisms from ethyl acetate).

Example A40: N-Isopropyl-2,5-dichlorobenzamide [III; Ar is 2,5-Cl$_2$C$_6$H$_3$, n is O, R is CH(CH$_3$)$_2$] (method A1), m.p. 131°–135° C.

Example A41: N-Isopropyl-3-nitro-4-chlorobenzamide [III; Ar is 3-O$_2$N-4-ClC$_6$H$_3$, n is O, R is CH(CH$_3$)$_2$] (method A1), m.p. 110°–115° C.

Example A42: N-(n-Propyl)-3-nitrobenzamide [III; Ar is 3-O$_2$NC$_6$H$_4$, n is O, R is CH$_2$CH$_2$CH$_3$] (method A1), m.p. 72°–74° C.

According to the above procedures, 3,4,5-trimethoxybenzoyl chloride, p-methylthiobenzoyl chloride, p-methylsulfoxybenzoyl chloride, p-methylsulfonylbenzoyl chloride, phenylacetyl chloride, 4-chlorophenylacetyl chloride, β-phenylpropionyl chloride, γ-phenylbutyryl chloride, 2-pyridylcarboxylic acid chloride, isonicotinoyl chloride or 3-pyridylacetyl chloride can be interacted with isopropylamine to give, respectively, N-isopropyl-3,4,5-trimethoxybenzamide [III; Ar is (CH$_3$O)$_3$C$_6$H$_2$, n is O, R is CH(CH$_3$)$_2$], N-isopropyl-4-methylthiobenzamide [III; Ar is 4-CH$_3$SC$_6$H$_4$, n is O, R is CH(CH$_3$)$_2$], N-isopropyl-4-methylsulfoxybenzamide [III; Ar is 4-CH$_3$SOC$_6$H$_4$, n is O, R is CH(CH$_3$)$_2$], N-isopropyl-4-methylsulfonylbenzamide [III; Ar is 4-CH$_3$So$_2$C$_6$H$_4$, n is O, R is CH(CH$_3$)$_2$], N-isopropylphenylacetamide [III; Ar is C$_6$H$_5$, n is 1, R is CH(CH$_3$)$_2$], N-isopropyl-4-chlorophenylacetamide [III; Ar is 4 - ClC$_6$H$_4$, n is 1, is CH(CH$_3$)$_2$], N-isopropyl-β-phenylpropionamide [III; Ar is C$_6$H$_5$, n is 2, R is CH(CH$_3$)$_2$], N-isopropyl-γ-phenylbutyramide [III; Ar is C$_6$H$_5$, n is 3, R is CH(CH$_3$)$_2$], N-isopropyl-2-pyridinecarboxamide [III; Ar is 2-pyridyl, n is O, R is CH(CH$_3$)$_2$], N-isopropylisonicotinamide [III; Ar is 4-pyridyl, n is O, R is CH(CH$_3$)$_2$], or N-isopropyl-3-pyridylacetamide [III; Ar is 3-pyridyl, n is 1, R is CH(CH$_3$)$_2$].

Example A43

1-(p-Chlorophenylthioacetyl)hexamethylenimine [V; Ar is 4-ClC$_6$H, n is 1, N=Z is N(CH$_2$)$_6$]

A mixture of 49.9 g. of p-chloroacetophenone, 35 g. of hexamethylenimine, 15.35 g. of sulfur and 75 ml. of dimethylformamide was heated on a steam bath for about 20 hours. The reaction mixture was concentrated to remove the solvent and then shaken with water and ether. The ether layer was separated, dried over anhydrous calcium sulfate and concentrated, and the residue crystallized to give 18.2 g. of 1-(p-chlorophenylthioacetyl)hexamethylenimine, yellow needles, m.p. 83°–85 C. when recrystallized from cyclohexane.

By replacing the p-chloroacetophenone in the foregoing preparation by a molar equivalent amount of p-chlorobutyrophenone there can be obtained 1-[γ-p-chlorophenyl)-thiobutyryl]hexamethylenimine [V; Ar is 4-$ClC_6H_4$, n is 3, N=Z is $N(CH_2)_6$].

B. Benzimidyl Chloride Derivatives and Analogs

EXAMPLE B1

N-Allyl-4-chlorobenzimidylChloride [IV; Ar is 4-$ClC_6H_4$, n is 0, R is $CH_2CH=CH_2$]

Phosphorus pentachloride (47.2 g.) and 250 ml. of benzene were stirred at reflux until the phosphorus pentachloride had dissolved. N-Allyl-4-chlorobenzamide (Example A1) (44.3 g.) was added in portions, and the reaction mixture was stirred at reflux until evolution of hydrogen chloride ceased (about four hours). The mixture was concentrated in vacuo to remove the solvent, and the residue was distilled to give 36.68 g. of N-allyl-4-chlorobenzimidyl chloride, b.p. 72°–82 C. (0.04 mm.), $n_D^{25} = 1.5727$.

According to the foregoing procedure the following compounds were prepared from the compounds of the respective examples under section A.

Example B2: N-Cyclopropylmethyl-4-chlorobenzimidyl Chloride [Iv; Ar is 4-$ClC_6H_4$, n is O, R is $CH_2CH(CH_2)_2$], b.p. 81°–89° C. (0.03 mm.), $n_D^{25}$ = 1.5707.

Example B3: N-Ethyl-4-chlorobenzimidyl Chloride [IV; Ar is 4-$ClC_6H_4$, n is O, R is $CH_2CH_3$] b.p. 55°–57° C. (0.03 mm.), $n_D^{25}$ = 1.5638.

Example B4: N-(2Chloroethyl)-4-chlorobenzimidyl Chloride [IV; Ar is 4-$ClC_6H_4$, n is O, R is $CH_2CH_2Cl$], b.p. 151°–152° C. (5 mm.), $n_D^{25}$ = 1.5822.

Example B5: N-(n-Propyl)-4-chlorobenzimidyl Chloride [IV; Ar is 4-$ClC_6H_4$, n is O, R is $CH_2CH_2CH_3$], b.p. 70°–74° C. (0.015 mm.), $n_D^{25}$ = 1.5556.

Example B6: N-Allyl-4-fluorobenzimidyl Chloride [IV; Ar is 4-$FC_6H_4$, n is O, R is $CH_2CH=CH_2$], b.p. 44–57° C. (0.03 mm.), $n_D^{25}$ =1.5385.

Example B7: N-Allyl-4-trifluoromethylbenzimidyl Chloride [IV; Ar is 4-$F_3CC_6H_4$, n is O, R is $CH_2CH=CH_2$], b.p. 44°–48° C. (0.12 mm.).

Example B8: N-benzyl-4-chlorobenzimidyl Chloride 8 IV; Ar is 4-$ClC_6H_4$, n is O, R is $CH_2C_6H_5$], b.p. 117°–142° C. (0.07 mm.).

Example B9: N-Cyclohexylmethyl-4-chlorobenzimidyl Chloride [IV; Ar is 4-$ClC_6H_4$, n is 0, R is $CH_2CH(CH_2)_5$], b.p. 126°–132° C. (0.01 mm.), $n_D^{25}$ = 1.5628.

Example B10: N-(2-Butenyl)-4-chlorobenzimidyl Chloride [IV; Ar is 4-$ClC_6H_4$, n is O, R is $CH_2CH=CHCHD3$], b.p. 90°–108° C. (0.35 mm.).

Example B11: N-Butyl-4-chlorobenzimidyl Chloride [IV; Ar is 4-$ClC_6H_4$, n is 0, R is $CH_2CH_2CH_2CH_3$], b.p. 61°–74 C. (0.1 mm.), $n_D^{25}$ = 1.5487.

Example B12: N-Isobutyl 4-chlorobenzimidyl Chloride [IV; Ar is 4-$ClC_6H_4$, n is 0, R is $CH_2CH(CH_3)_2$], b.p. 70°–78 C. (0.05 mm.), $n_D^{25}$ = 1.5455.

Example B13: N-(2-Phenylethyl)-4-chlorobenzimidyl Chloride [IV; Ar is 4-$ClC_6H_4$, n is 0, R is $CH_2Ch_2C_6H_5$], b.p. 112°–119° C. (0.04 mm.).

Example B14: N-Cyclopropylmethyl-4-fluorobenzimidyl Chloride [IV; Ar is 4-$FC_6H_4$, n is 0, R is $CH_2(CH_2)_2$], b.p. 65°–75° C. (0.03 mm.), $n_D^{25}$ = 1.5385.

Example B15: N-Allylbenzimidyl Chloride [IV; Ar is $C_6H_5$, n is O, R is $CH_2CH=CH_2$], b.p. 102°–105° C. (5 mm.), $n_D^{25}$ = 1.5575.

Example B16: N-Allyl-4-bromobenzimidyl Chloride [IV; Ar is 4-$BrC_6H_4$, n is 0, R is $CH_2CH=CH_2$], b.p. 97°–104bL C. (0.35 mm.), $n_D^{25}$ = 1.5945.

Example B17: N-(2-Methylbutyl)-4-chlorobenzimidyl Chloride [IV; Ar is 4-$ClC_6H_4$, n is O, R is $CH_2CH(CH_3)CH_2CH_3$], b.p. 98°–108° C. (0.08 mm.), $n_D^{25}$ = 1.5430.

Example B18: N-(n-Propyl)benzimidyl Chloride [IV; Ar is $C_6H_5$, n is O, R is $CH_2CH_2CH_3$], b.p. 100°–104° C. (5 mm.), $n_D^{25}$ = 1.5408.

Example B19: N-(n-Propyl)-4-iodobenzimidyl Chloride [IV; Ar is 4-$IC_6H_4$, n is O, R is $CH_2CH_2CH_3$], b.p. 115°–120° C. (0.3 mm.), $n_D^{25}$ = 1.6120.

Example B20: N-Cyclopropylmethyl-4-iodobenzimidyl Chloride [IV; Ar is 4-$IC_6H_4$, n is O, R is $CH_2CH(CH_2)_2$], yellow solid.

Example B21: N-Methyl-4-chlorobenzimidyl Chloride [IV: Ar is 4-$ClC_6H_4$, n is O, R is $CH_3$], b.p. 128°–130° C. (17 mm.).

Example B22: N-(n-Propyl)-2,6-dichlorobenzimidyl Chloride [IV; Ar is 2,6-$Cl_2C_6H_3$, n is O, R is $CH_2CH_2CHC3$], colorless oil.

Example B23: N-Isopropyl-4-chlorobenzimidyl Chloride [IV; Ar is 4-$ClC_6H_4$, n is O, R is $CH(CH_3)_2$], b.p. 58°–69° C. (0.05 mm.), $n_D^{25}$ = 1.5496.

Example B24: N-Cyclopropyl-4-chlorobenzimidyl Chloride [IV; Ar is 4-$ClC_6H_4$, n is O, R is $CH(CH_2)_2$], b.p. 153°–154° C. (6 mm.), $n_D^{25}$ = 1.5936.

Example B25: N-Isopropylnicotinimidyl Chloride [IV; Ar is 3-pyridyl, n is O, R is $CH(CH_3)_2$], colorless solid.

Example B26: N-(n-Propyl)-4-nitrobenzimidyl Chloride [IV; Ar is 4-$O_2NC_6H_4$, n is O, R is $CH_2CH_2CH_3$], yellow oil.

Example B27: N-(n-Propyl)-4-methoxybenzimidyl chloride [IV; Ar is 4-$CH_3OC_6H_4$, n is O, R is $CH_2CH_2CH_3$], b.p. 92°–111° C. (0.2-0.35 mm.), $n_D^{25}$ = 1.5555.

Example B28: N-Isopropyl-2-chlorobenzimidyl Chloride [IV; Ar is 2-$ClC_6H_4$, n is O, R is $CH(CH_3)_2$], b.p. 49°–56° C. (0.08 mm.), $n_D^{25}$ = 1.5358.

Example B29: N-(n-Propyl)-4-methylbenzimidyl Chloride [IV: Ar is 4-$CH_3C_6H_4$, n is 0, R is $CH_2CH_2CH_3$], b.p. 65°–66° C. (0.055 mm.), $n_D^{25}$ = 1.5410. In this preparation, the phosphorus pentachloride was replaced by thionyl chloride.

Example B30; N-Isopropyl-3-chlorobenzimidyl Chloride [IV; Ar is 3-$ClC_6H_4$, n is O, R is $CH(CH_3)_2$], b.p. 64°–69° C. (0.070 mm.), $n_D^{25}$ = 1.5460.

Example B31: N-(n-Propyl)-3,4-dichlorobenzimidyl Chloride [IV; Ar is 3,4-$Cl_2C_6H_3$, n is O, R is $CH_2CH_2CHC3$], b.p. 94°–95° C. (1mm.), $n_D^{25}$ = 1.5690.

Example B32: N-Isopropyl-3,4-dichlorobenzimidyl Chloride [IV; Ar is 3,4-$Cl_2C_6H_3$, n is O, R is $CH(CH_3)_2$], b.p. 88°–93° C. (0.06–0.065 mm.), $n_D^{25}$ = 1.5632.

Example B33: N-(n-Propyl)-3-methoxy-4-chlorobenzimidyl Chloride [IV; Ar is 3-$CH_3$-O-4-$C_6H_3$, n is O, R is $CH_2CH_2CH_3$], b.p. 103°–105° C. (0.14 mm.), $n_D^{25}$ = 1.5624.

Example B34: N-(n-propyl)-3,5-dichlorobenzimidyl Chloride [IV; Ar is 3,5-Cl$_2$C$_6$H$_3$, $n$ is O, R is CH$_2$CH$_2$CH$_3$], b.p. 106°–109° C. (0.2 mm.), $n_D^{25}$ = 1.5620.

Example B35: N-Isopropyl-2,4-dichlorobenzimidyl Chloride [IV; Ar is 2,4-Cl$_2$C$_6$H$_3$, $n$ is O, R is CH(CH$_3$)$_2$], b.p. 98°–100° C. (0.08 mm.), $n_D^{25}$ = 1.5492.

Example B36: N-(n-Propyl)-2,4-dichlorobenzimidyl Chloride [IV; Ar is 2,4-Cl$_2$C$_6$H$_3$, $n$ is O, R is CH(CH$_3$)$_2$], b.p. 105°–111° C. (0.10 mm.), $n_D^{25}$ = 1.5566.

Example B37: N-Isopropyl-4-trifluoromethoxybenzimidyl Chloride [IV; Ar is 4-F$_3$COC$_6$H$_4$, $n$ is O, R is CH(CH$_3$)$_2$], b.p. 61°–62° C. (0.26 mm.), $n_D^{25}$ = 1.5720.

Example B38: N-Isopropyl-3,5-dichlorobenzimidyl Chloride [IV; Ar is 3,5-Cl$_2$C$_6$H$_3$, $n$ is O; R is CH(CH$_3$)$_2$], b.p. 61°–64° C. (0.010–0.015 mm.), $n_D^{25}$ = 1.5570.

Example B39: N-(3-Chloropropyl)-4-chlorobenzimidyl Chloride [IV; Ar is 4-ClC$_6$H$_4$, $n$ is O, R is CH$_2$CH$_2$CH$_2$Cl], b.p. 102°–105° C. (0.085–0.13 mm.), $n_D^{25}$ = 1.5731.

Example B40: N-Isopropyl-2,5-dichlorobenzimidyl Chloride [IV; Ar is 2,5-Cl$_2$C$_6$H$_3$, $n$ is O, R is CH(CH$_3$)$_2$], b.p. 74° C. (0.060 mm.), $n_D^{25}$ = 1.5474.

Example B41: N-Isopropyl-3-nitro-4-chlorobenzimidyl Chloride [IV; Ar is 3-O$_2$N-4-ClC$_6$H$_3$, $n$ is O, R is CH(CH$_3$)$_2$].

Example B42: N-(n-Propyl)-3-nitrobenzimidyl Chloride [IV; Ar is 3-O$_2$NC$_6$H$_4$, $n$ is O, R is CH$_2$CH$_2$CH$_3$], b.p. 95°–109b$L$ C. (0.06–0.09 mm.), $n_D^{25}$ = 1.5603.

Similarly, N-isopropyl-3,4,5-trimethoxybenzamide, N-isopropyl-4-methylthiobenzamide, N-isopropyl-4-methylsulfoxybenzamide, N-isopropyl-4-methylsulfonylbenzamide, N-isopropylphenylacetamide, N-isopropyl-4-chlorophenylacetamide, N-isopropyl-β-phenylpropionamide, N-isopropyl-γ-phenylbutyramide N-isopropyl-2-pyridinecarboxamide, N-isopropylisonicotinamide or N-isopropyl-3-pyridylacetamide can be interacted with phosphorus pentachloride to yield N-isopropyl-3,4,5-trimethoxybenzimidyl chloride [IV; Ar is 3,4,5-(CH$_3$O)$_3$C$_6$H$_2$, $n$ is O, R is CH(CH$_3$)$_2$], N-isopropyl-4-methylthiobenzimidyl chloride [IV; Ar is 4-CH$_3$SC$_6$H$_4$, $n$ is O, R is CH(CH$_3$)$_2$], N-isopropyl-4-methylsulfoxybenzimidyl chloride [IV; Ar is 4-CH$_3$SOC$_6$H$_4$, $n$ is O, R is CH(CH$_3$)$_2$], N-isopropyl-4-methylsulfonylbenzimidyl chloride [IV; Ar is 4-CH$_3$SO$_2$C$_6$H$_4$, $n$ is O, R is CH(CH$_3$)$_2$], N-isopropylphenylacetimidyl chloride [IV; Ar is C$_6$H$_5$, $n$ is 1, R is CH(CH$_3$)$_2$], N-isopropyl-4-chlorophenylacetimidyl chloride [IV; Ar is 4-ClC$_6$H$_4$, $n$ is 1, R is CH(CH$_3$)$_2$], N-isopropyl-β-phenylpropionimidyl chloride [IV; Ar is C$_6$H$_5$, $n$ is 2, R is CH(CH$_3$)$_2$], N-isopropyl-γ-phenylbutyrimidyl chloride [IV; Ar is C$_6$H$_5$, $n$ is 3, R is CH(CH$_3$)$_2$], N-isopropyl-2-pyridinecarboximidyl chloride [IV; Ar is 2-pyridyl, $n$ is O, R is CH(CH$_3$)$_2$], N-isopropylisonicotinimidyl chloride [IV; Ar is 4-pyridyl, $n$ is O, R is CH(CH$_3$)$_2$], or N-isopropyl-3-pyridylacetimidyl chloride [IV; Ar is 3-pyridyl, $n$ is 1, R is CH(CH$_3$)$_2$].

C. Benzamidine Derivatives and Analogs

EXAMPLE C1

1-(N-Allyl-p-chlorobenzimidoyl)hexamethylenimine [I; Ar is 4-ClC$_6$H$_4$, $n$ is O, R is CH$_2$CH=CH$_2$, N=Z is N(CH$_2$)$_6$].

A mixture of 36.68 g. of N-allyl-4-chlorobenzimidyl chloride (Example B1) and 35.8 g. of hexamethylenimine in 250 ml. of benzene was heated at reflux for two hours. The reaction mixture was filtered to remove the hexamethylenimine hydrochloride formed, washed with the dilute sodium hydroxide and water, dried, and concentrated to remove the solvent. The residue was distilled to give 29.5 g. of 1-(N-allyl-p-chlorobenzimidoyl)-hexamethylenimine b.p. 105°–106° C. (0.02 mm.), $n_D^{25}$ = 1.5638. The free base was converted to its p-toluenesulfonate salt form, colorless prisms, m.p. 167°–169° C., when recrystallized from acetone.

By replacing the hexamethylenimine in the foregoing procedure by a molar equivalent amount of dimethylamine, diisopropylamine, di-(n-hexyl)amine, dicylcohexylamine, N-cyclopentyl-N-methylamine, heptamethylenimine, octamethylenimine, morpholine, piperazine, 1-methylpiperazine, 1-phenylpiperazine, dibenzylamine or N-benzyl-N-methylamine, there can be obtained, respectively, N,N-dimethyl-N'-allyl-p-chlorobenzamidine [I; Ar is 4-ClC$_6$H$_4$, $n$ is O, R is CH$_2$CH=CH$_2$, N=Z is N(CH$_3$)$_2$], N,N-diisopropyl-N'-allyl-p-chlorobenzamidine [I; Ar is 4-ClC$_6$H$_4$, $n$ is O, R is CH$_2$CH=CH$_2$, N=Z is N[CH(CH$_3$)$_2$]$_2$], N,N-di-(n-hexyl)-N'-allyl-p-chlorobenzamidine [I; Ar is 4-ClC$_6$H$_4$, $n$ is O, R is CH$_2$CH=CH$_2$, N=Z is N(C$_6$H$_{13}$)$_2$], N,N-dicyclohexyl-N'-allyl-p-chlorobenzamidine [I; Ar is 4-ClC$_6$H$_4$, $n$ is O, R is CH$_2$CH=CH$_2$, N=Z is N(C$_6$H$_{11}$)$_2$], N-cyclopentyl-N-methyl-N'-allyl-p-chlorobenzamidine [I; Ar is 4-ClC$_6$H$_4$, $n$ is O, R is CH$_2$CH=CH$_2$, N=Z is N(C$_5$H$_9$)(CH$_3$)], 1-(N-allyl-p-chlorobenzimidoyl)heptamethyleneimine [I; Ar is 4-ClC$_6$H$_4$, $n$ is 0, R is CH$_4$CH=CH$_2$, N=Z is N(CH$_2$)$_2$], 1-(N-allyl-p-chlorobenzimidoyl)octamethylenimine [I; Ar is 4-ClC$_6$H$_4$, $n$ is 0, R is CH$_2$CH=CH$_2$, N=Z is N(CH$_2$)$_8$], 4-(N-allyl-p-chlorobenzimidoyl)morpholine [I; Ar is 4-ClC$_6$H$_4$, $n$ is 0, R is CH$_2$CH=CH$_2$, N=Z is N(CH$_2$)$_4$O], 1-(N-allyl-p-chlorobenzimidoyl)-piperazine [I; Ar is 4-ClC$_6$H$_4$, $n$ is O, R is CH$_2$CH=CH$_2$, N=Z is N(CH$_2$)$_4$NH], 1-(N-allyl-p-chlorobenzimidoyl)-4-methylpiperazine [I; Ar is 4-ClC$_6$H$_4$, $n$ is O, R is CH$_2$CH=CH$_2$, N=Z is N(CH$_2$)$_4$NCH$_3$], 1-(N-allyl p-chlorobenzimidoyl)-4-phenylpiperazine [I; Ar is 4-ClC$_6$H$_4$, $n$ is O, R is CH$_2$CH=CH$_2$, N=Z is N(CH$_2$)$_4$NC$_6$H$_5$], N,N-dibenzyl-N'-allyl-p-chlorobenzamidine [I; Ar is 4-ClC$_6$H$_4$, $n$ is O, R is CH$_2$CH=CH$_2$, N=Z is N(CH$_2$C$_6$H$_5$)$_2$], or N-benzyl-N-methyl-N'-allyl-p-chlorobenzamidine [I; Ar is 4-ClC$_6$H$_4$, $n$ is O, R is CH$_2$CH=CH$_2$, N=Z is N(CH$_2$C$_6$H$_5$)(CH$_3$)].

By replacing the N-allyl-4-chlorobenzimidyl chloride in the foregoing procedure (Example C1) by a molar equivalent amount of N-isopropyl-3,4,5-trimethoxybenzimidyl chloride, N-isopropyl-4-methylthiobenzimidyl chloride, N-isopropyl-4-methylsulfoxybenzimidyl chloride, N-isopropyl-4-methylsulfonylbenzyimidyl chloride, N-isopropylphenylacetimidyl chloride, N-isopropyl-4-chlorophenylacetimidyl chloride, N-isopropyl-β-phenylpropionimidyl chloride, N-isopropyl-γ-phenylbutyrimidyl chloride, N-isopropyl-2-pyridinecarboximidyl chloride, N-isopropylisonicotinimidyl chloride, or N-isopropyl-3-pyridylacetimidyl chloride there can be obtained, respectively, 1-(N-isopropyl-3,4,5-trimethoxybenzimidoyl)hexamethylenimine [I; Ar is 3,4,5-

($CH_3O)_3C_6H_2$, $n$ is O, R is $CH(CH_3)_2$, N=Z is $N(CH_2)_6$], 1-(N-isopropyl-4-methylthiobenzimidoyl)hexamethylenimine [I; Ar is 4-$CH_3SC_6H_4$, $n$ is O, R is $CH(CH_3)_2$, N=Z is $N(CH_2)_6$], 1-(N-isopropyl-4-methylsulfoxybenzimidoyl)hexamethylenimine [I; Ar is 4-$CH_3SOC_6H_4$, $n$ is O, R is $CH(CH_3)_2$, N=Z is $N(CH_2)_6$], 1-(N-isopropyl-4-methylsulfonylbenzimidoyl)hexamethylenimine [I; Ar is 4-$CH_3SO_2C_6H_4$, $n$ is O, R is $CH(CH_3)_2$, N=Z is $N(CH_2)_6$], 1-(N-isopropylphenylacetimidoyl)hexamethylenimine [I; Ar is $C_6H_5$, $n$ is 1, R is $CH(CH_3)_2$, N=Z is $N(CH_2)_6$], 1-(N-isopropyl-4-chlorophenylacetimidoyl)hexamethylenimine [I; Ar is 4-$ClC_6H_4$, $n$ is 1, R is $CH(CH_3)_2$, N=Z is $N(CH_2)_6$], 1-(N-isopropyl-β-phenylpropionimidoyl)hexamethylenimine [I; Ar is $C_6H_5$, $n$ is 2, R is $CH(CH_3)_2$, N=Z is $N(CH_2)_6$], 1-(N-isopropyl-γ-phenylbutyrimidoyl)hexamethylenimine [I; Ar is $C_6H_5$, $n$ is 3, R is $CH(CH_3)_2$, N=Z is $N(CH_2)_6$], 1-(N-isopropyl-2-pyridinecarboximidoyl)hexamethylenimine [I; Ar is 2-pyridyl, $n$ is O, R is $CH(CH_3)_2$, N=Z is $N(CH_2)_6$], 1-(N-isopropylisonicotinimidoyl)hexamethylenimine [I; Ar is 4-pyridyl, $n$ is O, R is $CH(CH_3)_2$, N=Z is $N(CH_2)_6$], or 1-(N-isopropyl-3-pyridylacetimidoyl)hexamethylenimine [I; Ar is 3-pyridyl, $n$ is 1, R is $CH(CH_3)_2$, N=Z is $N(CH_2)_6$].

Similarly were prepared the following compounds.

Example C2: 1-(N-Cyclopropylmethyl-p-chlorobenzimidoyl)hexamethylenimine [I; Ar is 4-$ClC_6H_4$, $n$ is O, R is $CH_2CH(CH_2)_2$, N=Z is $N(CH_2)_6$] (from compound of Example B2 and hexamethylenimine), b.p. 70°–72° C. (0.01 mm), colorless needles, m.p. 35°–40° C; p-toluenesulfonate salt form, m.p. 115.5°–118° C., colorless from isopropyl acetate.

EXAMPLE C3: 1-(N-Ethyl-p-chlorobenzimidoyl)hexamethylenimine [I; Ar is 4-$ClC_6H_4$, $n$ is O, R is $CH_2CH_3$, N=Z is $N(CH_2)_6$] (from compound of Example B3 and hexamethylenimine), p-toluenesulfonate salt form, m.p. 183–187° C., colorless blades from acetone acetonitrile.

Example C4: 1-[N-(n-Propyl)-p-chlorobenzimidoyl]hexamethylenimine [I; Ar is 4-$ClC_6H_4$, $n$ is 0, R is $CH_2CH_2CH_3$, N=Z is N $(CH_2)_6$] (from compound of Example B5 and hexamethylenimine), b.p. 94°–106° C. (0.04 mm.); p-toluenesulfonate salt form, m.p. 143°–144° C., colorless prisms from acetone.

EXAMPLE C5: 1-(N-Allyl-p-fluorobenzimidoyl)hexamethylenimine [I; Ar is 4-$FC_6H_4$, $n$ is O, R is $CH_2CH=CH_2$, N=Z is $N(CH_2)_6$] (from compound of Example B6 and hexamethylenimine), b.p. 86°–88° C. (0.03 mm.), $n_D^{25}$ = 1.5395; p-toluenesulfonate salt form, m.p. 125°–126° C., colorless needles from acetone-ether.

Example C6: 1-(N-Allyl-p-trifluoromethylbenzimidoyl)hexamethylenimine [I; Ar is 4-$F_3CC_6H_4$, $n$ is O, R is $CH_2CH=CH_2$, N=Z is $N(CH_2)_6$] (from compound of Example B7 and hexamethylenimine), b.p. 86°–88 C. (0.03 mm.), $n_D^{25}$ = 1.5395; p-toluene-sulfonate salt form, m.p. 164°–169° C., colorless prisms from acetone-ether.

Example C7: N,N,N'-Triallyl-p-chlorobenzamidine [I; Ar is 4-$ClC_6H_4$, $n$ is O, R is $CH_2CH=CH_2$, N=Z is $N(CH_2CH=CHD2)_2$] (from compound of Example B1 and diallylamine), b.p. 90°–96° C. (0.04 mm.), $n_D^{25}$ = 1.5507, pale yellow oil.

Example C8: 1-(N-Benzyl-p-chlorobenzimidoyl)hexamethylenimine [I; Ar is 4-$ClC_6H_4$, $n$ is O, R is $CH_2C_6H_5$, N=Z is $N(CH_2)_6$] (from compound of Example B8 and hexamethylenimine), b.p. 133–137° C. (0.15 mm.), $n_D^{25}$ = 1.5923, colorless dendrites, m.p. 58°–68 °C.

Example C9: 1-(N-Cyclohexylmethyl-p-chlorobenzimidoyl)hexamethylenimine [I; Ar is 4-$ClC_6H_4$, $n$ is O, R is $CH_2CH(CH_2)_5$, N=Z is $N(CH_2)_6$] (from compound of Example B9 and hexamethylenimine), b.p. 151°–152° C. (0.32 mm.), m.p. 42°–60 C. (colorless spherulites).

Example C10: 1-[N-(2-Butenyl)-p-chlorobenzimidoyl]hexamethylenimine [I; Ar is 4-$ClC_6H_4$, $n$ is O, R is $CH_2CH=CHCH_3$, N=Z is $N(CH_2)_6$] (from compound of Example B10 and hexamethylenimine), b.p. 114–121° C. (0.07 mm.), $n_D^{25}$ = 1.5588, pale yellow oil.

Example C11: 1-[N-(n-Butyl)-p-chlorobenzimidoyl]hexamethylenimine [I; Ar is 4-$ClC_6H_4$, $n$ is O, R is $CH_2CH_2CH_2CH_3$, N=Z is $N(CH_2)_6$] (from compound of Example B11 and hexamethylenimine), b.p. 123°–126°C. (0.1 mm.), $n_D^{25}$ = 1.5443, pale yellow oil.

Example C12: 1-(N-Isobutyl-p-chlorobenzimidoyl)hexamethylenimine [I; Ar is 4-$ClC_6H_4$, n is O, R is $CH_2CH(CH_3)_2$, N=Z is $N(CH_2)_6$] (from compound of Example B12 and hexamethylenimine), b.p. 107°–112° C. (0.035 mm.), $n_D^{25}$ = 1.5435; p-toluenesulfonate salt form, m.p. 75°–87° C., prisms from isopropyl acetate.

Example C13: 1-[N-(2-Phenylethyl)-p-chlorobenzimidoyl]hexamethylenimine [I; Ar is 4-$ClC_6H_4$, $n$ is O, R is $CH_2CH_2C_6H_5$, N=Z is $N(CH_2)_6$] (from compound of Example B13 and hexamethylenimine), hydrochloride salt form, m.p. 186°–188° C., colorless prisms from acetone.

Example C14: 1-(N-Cyclopropylmethyl-p-fluorobenzimidoyl)hexamethylenimine [I; Ar is 4-$FC_6H_4$, $n$ is O, R is $CH_2CH(CH_2)_2$, N=Z is $N(CH_2)_6$] (from compound of Example B14 and hexamethylenimine), b.p. 120°–133° C. (0.12 mm.), $n_D^{25}$ = 1.5380, colorless oil.

Example C15: 1-(N-Allylbenzimidoyl)hexamethylenimine [I; Ar is $C_6H_5$, n is O, R is $CH_2CH=CH_2$, N=Z is $N(CH_2)_6$] (from compound of Example B15 and hexamethylenimine), b.p. 117° C. (0.15 mm.), $n_D^{25}$ = 1.5532; cyclohexanesulfamate salt, m.p. 114–116°C., colorless prisms from ethyl acetate.

Example C16: 1-(N-Allyl-4-bromobenzimidoyl)hexamethylenimine [I; Ar is 4-$BrC_6H_4$, $n$ is O, R is $CH_2CH=CH_2$, N=Z is $N(CH_2)_6$] (from compound of Example B16 and hexamethylenimine), b.p. 127°–144° C. (0.015 mm.), yellow oil; $n_D^{25}$ = 1.5783.

Example C17: 1-[N-(2-Methylbutyl)-4-chlorobenzimidoyl]hexamethylenimine [I; Ar is 4-$ClC_6H_4$, n is O, R is $CH_2CH(CH_3)CH_2CH_3$, N=Z is $N(CH_2)_6$] (from compound of Example B17 and hexamethyleneimine), b.p. 143°–155° C. (0.03 mm.), pale yellow oil; $n_D^{25}$ = 1.5935.

Example C18: 1-[N-(n-Propyl)benzimidoyl]hexamethylenimine [I; Ar is $C_6H_5$, n is O, R is $CH_2CH_2CH_3$, N=Z is $N(CH_2)_6$] (from compound of Example B18 and hexamethylenimine), cyclohexanesulfamate salt, colorless blades, m.p. 110°–122° C.

Example C19: 1-[N-(n-Propyl)-4-iodobenzimidoyl]hexamethylen-imine [I; Ar is 4-$IC_6H_4$, n is O, R is $CH_2CH_2CH_3$, N=Z is $N(CH_2)_6$] (from compound of Example B19 and hexamethylenimine), hydrochloride salt, m.p. 225°–227° C., colorless prisms from acetonitrile and acetonitrile-isopropyl alcohol.

Example C20: 1-(N-Cyclopropylmethyl-4-iodobenzimidoyl)hexamethylenimine [I; Ar is 4-$IC_6H_4$, n is O, R is $CH_2CH(CH_2)_2$, N=Z is $N(CH_2)_6$] (from compound of Example B20 and hexamethylenimine), hydrochloride salt, m.p. 240°–242°C., colorless needles from ethyl acetate-acetonitrile.

Example C21: 1-(N-Methyl-4-chlorobenzimidoyl)hexamethylenimine [I; Ar is 4-$ClC_6H_4$, n is O, R is $CH_3$, N=Z is $N(CH_2)_6$] (from compound of Example B21 and hexamethylenimine), b.p. 110°–118° C. (0.03 mm.), $n_D^{25}$ = 1.5665; solidified to waxy dendrite needles.

Example C22: 1-[N-(n-Propyl)-2,6-dichlorobenzimidoyl]hexamethylenimine [I; Ar is 2,6-$Cl_2C_6H_3$, n is O, R is $CH_2CH_2CH_3$, N=Z is $N(CH_2)_6$] (from compound of Example B22 and hexamethylenimine), p-toluenesulfonate salt, m.p. 122°–127° C., colorless massive prisms from ethyl acetate-acetonitrile.

Example C23: 1-(N-Isopropyl-4-chlorobenzimidoyl)hexamethylenimine [I; Ar is 4-$ClC_6H_4$, n is O, R is $CH(CH_3)_2$, N=Z is $N(CH_2)_6$] (from compound of Example B23 and hexamethylenimine), hydrochloride salt, m.p. 241°–243°C., colorless prisms from acetonitrile-ether.

Example C24: 1-[N-(n-Propyl)-4-chlorobenzimidoyl]-4-piperidinol [I; Ar is 4-$ClC_6H_4$, n is O, R is $CH_2CH_2CH_3$, N=Z is $N(CH_2)_4CHOH$] (from compound of Example B5 and 4-hydroxypiperidine), hydrochloride salt, m.p. 163°–164° C., colorless rods from acetone-acetonitrile.

Example C25: 1-[N-(n-Propyl)-4-chlorobenzimidoyl]piperidine [I; Ar is 4-$ClC_6H_4$, n is O, R is $CH_2CH_2CH_3$, N=Z is $N(CH_2)_5$] (from compound of Example B5 and piperidine), hydrochloride salt, m.p. 186°–188° C., colorless rods from isopropyl acetate-acetonitrile.

Example C26: 1-(N-Cyclopropyl-4-chlorobenzimidoyl)hexamethylenimine [I; Ar is 4-$ClC_6H_4$, n is O, R is $CH(CH_2)_2$, N=Z is $N(CH_2)_6$] (from compound of Example B24 and hexamethylenimine), p-toluenesulfonate salt, m.p. 155°–157° C., colorless prisms from acetonemethanol.

Example C27: 1-(N-Isopropylnicotinimidoyl)hexamethylenimine [I; Ar is 3-pyridyl, n is O, R is $CH(CH_3)_2$, N=Z is $N(CH_2)_6$] (from compound of Example B25 and hexamethylenimine), b.p. 85°–87° C. (0.15 mm.), colorless waxy spherulites.

Example C28: 1-[N-(n-Propyl)-4-nitrobenzimidoyl]hexamethylenimine [I; Ar is 4-$O_2NC_6H_4$, n is O, R is $CH_2CH_2CH_3$, N=Z is $N(CH_2)_6$] (from compound of Example B26 and hexamethylenimine), hydrochloride salt, m.p. 189°–191° C., pale yellow prisms from acetone.

Example C29: 1-[N-(n-Propyl)-4-methoxybenzimidoyl]hexamethylenimine [I; Ar is 4-$CH_3OC_6H_4$, n is O, R is $CH_2CH_2CH_3$, N=Z is $N(CH_2)_6$] (from compound of Example B27 and hexamethylenimine), hydrochloride salt, m.p. 158°–159° C., colorless microprisms from ethyl acetate.

Example C30: 1-(N-Isopropyl-2-chlorobenzimidoyl)hexamethylenimine [I; Ar is 2-$ClC_6H_4$, n is O, R is $CH(CH_3)_2$, N=Z is $N(CH_2)_6$] (from compound of Example B28 and hexamethylenimine), b.p. 104°–105° C. (0.050 mm.) $n_D^{25}$ = 1.5422.

Example C31: 1-[N-(n-Propyl)-4-chlorobenzimidoyl]pyrrolidine [I; Ar is 4-$ClC_6H_4$, n is O, R is $CH_2CH_2CH_3$, N=Z is $N(CH_2)_4$] (from compound of Example B5 and pyrrolidine), hydrochloride salt, m.p. 250°–253° C., colorless plates from acetone.

Example C32: 1-(N-Isopropyl-4-chlorobenzimidoyl)piperidine [I; Ar is 4-$ClC_6H_4$, n is O, R is $CH(CH_3)_2$, N=Z is $N(CH_2)_5$] (from compound of Example B23 and piperidine), hydrochloride salt, m.p. 202°–203° C., colorless flat needles from ethyl acetate.

Example C33: 1-[N-(n-Propyl)-4-methylbenzimidoyl]hexamethylenimine [I; Ar is 4-$CH_3C_6H_4$, n is O, R is $CH_2CH_2CH_3$, N=Z is $N(CH_2)_6$] (from compound of Example B29 and hexamethylenimine), cyclohexanesulfamate salt, m.p. 116°–118° C., colorless elongated needles from acetone-ether.

Example C34: 1-(N-Isopropyl-3-chlorobenzimidoyl)hexamethylenimine [I; Ar is 3-$ClC_6H_4$, n is O, R is $CH(CH_3)_2$, N=Z is $N(CH_2)_6$] (from compound of Example B30 and hexamethylenimine), b.p. 114°–119° C. (0.045–0.050 mm.), $n_D^{25}$ = 1.5418; hydrochloride salt, m.p. 175°–178° C., colorless prisms from ethyl acetate.

Example C35: 1-[N-(n-Propyl)-3,4-dichlorobenzimidoyl]hexamethylenimine [I; Ar is 3,4-$Cl_2C_6H_3$, n is O, R is $CH_2CH_2CH_3$, N=Z is $N(CH_2)_6$] (from compound of Example B31 and hexamethylenimine), hydrochloride salt, m.p. 181°–184° C. (dec.), colorless flat needles from ethyl acetate.

Example C36: 1-(N-Isopropyl-3,4-dichlorobenzimidoyl)hexamethylenimine [I; Ar is 3,4-$Cl_2C_6H_3$, n is O, R is $CH(CH_3)_2$, N=Z is $N(CH_2)_6$] (from compound of Example B32 and hexamethylenimine), hydrochloride salt, m.p. 172°–174° C., colorless needles from acetone.

Example C37: 1-[N-(n-Propyl)-3-methoxy-4-chlorobenzimidoyl]-hexamethylenimine [I; Ar is 3-$CH_3O$-4-$ClC_6H_3$, n is O, R is $CH_2CH_2CH_3$, N=Z is $N(CH_2)_6$] (from compound of Example B33 and hexamethylenimine), hydrochloride salt, m.p. 164°–165° C., colorless needles from ethyl acetate.

Example C38: 1-[N-(n-Propyl)-3,5-dichlorobenzimidoyl]hexamethylenimine [I; Ar is 3,5-$Cl_2C_6H_3$, n is O, R is $CH_2CH_2CH_3$, N=Z is $N(CH_2)_6$] (from compound of Example B34 and hexamethylenimine), hydrochloride salt, m.p. 115°–116° C., colorless prisms from acetone-acetonitrile-ether.

Example C39: 1-(N-Isopropyl-2,4-dichlorobenzimidoyl)hexamethylenimine [I; Ar is 2,4-$Cl_2C_6H_3$, n is O, R is $CH(CH_3)_2$, N=Z is $N(CH_2)_6$] (from compound of Example B35 and hexamethylenimine), hydrochloride salt, m.p. 220°–223 °C., colorless crystals from acetone-acetonitrile.

Example C40: 1-[N-(n-Propyl)-2,4-dichlorobenzimidoyl]hexamethylenimine [I; Ar is 2,4-$Cl_2C_6H_3$, n is O, R is $CH_2CH_2CH_3$, N=Z is $N(CH_2)_6$] (from compound of Example B36 and hexamethylenimine), hydrochloride salt, m.p. 126°–129° C., colorless crystals from ethyl acetate.

Example C41: 1-(N-Isopropyl-4-trifluoromethoxybenzimidoyl)-hexamethylenimine [I; Ar is 4-F$_3$COC$_6$H$_4$, $n$ is O, R is CH(CH$_3$)$_2$, N=Z is N(CH$_2$)$_6$] (from compound of Example B37 and hexamethylenimine), p-toluenesulfonate salt, m.p. 154°–156° C., colorless massive prisms from acetone-ether.

Example C42: 1-(N-Isopropyl-3,5-dichlorobenzimidoyl)hexamethylenimine [I; Ar is 3,5-Cl$_2$C$_6$H$_3$, n is O, R is CH(CH$_3$)$_2$, N=Z is N(CH$_2$)$_6$] (from compound of Example B38 and hexamethylenimine), hydrochloride salt, m.p. 205°–207° C., colorless prismatic blades from acetone-ether.

EXAMPLE C43 a. 1-[N-(2-Chloroethyl)-4-chlorobenzimidoyl]hexamethylenimine [I; Ar is 4-ClC$_6$H$_4$, n is O, R is CH$_2$CH$_2$Cl, N=Z is N(CH$_2$)$_6$] (from compound of Example B4 and hexamethylenimine), m.p. 68°–70° C. (from n-pentane).

b. 1-[N-(2-Acetoxyethyl)-4-chlorobenzimidoyl]hexamethylenimine [I; Ar is 4-ClC$_6$H$_4$, n is O, R is CH$_2$CH$_2$OCOCH$_3$, N=Z is N(CH$_2$)$_6$].

A mixture of 54.69 g. of 1-[N-(2-chloroethyl)-4-chlorobenzimidoyl]hexamethylenimine, 24.6 g. of potassium acetate and 200 ml. of dimethylformamide was stirred at reflux for about 16 hours. The reaction mixture was filtered and the filtrate evaporated to remove the solvent. The residue was partitioned between water and ether, and the ether layer was washed with water, dried and concentrated. The residue was treated with 24.2 g. of cyclohexanesulfamic acid in acetone and the product precipitated with ether and n-pentane to give 1-[N-(2-acetoxyethyl)-4-chlorobenzimidoyl]hexamethylenimine in the form of its cyclohexanesulfamate salt, m.p. 110°–112° C., colorless needles from isopropyl acetate.

EXAMPLE C44

1-[N-(n-Propyl)-4-chlorobenzimidoyl]-4-hydroxyhexamethylenimine [I; Ar is 4-ClC$_6$H$_4$, $n$ is O, R is CH$_2$CH$_2$CHC3, N=Z is 4-hydroxyhexamethylenimino]

N-(n-Propyl)-4-chlorobenzimidyl chloride (Example B5) (10.8 g.) was added dropwise to a chilled solution (ice-methanol) of 5.76 g. of 4-hydroxyhexamethylenimine and 5.06 g. of triethylamine in 125 ml. of chloroform. The reaction mixture was stirred for 2 hours at room temperature, and the product isolated and treated with hydrogen chloride in ether. There was thus obtained 1-[N-(n-propyl)-4-chlorobenzimidoyl]-4-hydroxyhexamethylenimine in the form of its hydrochloride salt, m.p. 139°–141° C., colorless blades from cyclohexanone and from acetone-acetonitrile.

EXAMPLE C45

1-[N-(n-Propyl)-2-nitro-4-chlorobenzimidoyl]hexamethylenimine [I; Ar is 2-O$_2$N-4-ClC$_6$H$_3$, $n$ is O, R is CH$_2$CH$_2$CH$_3$, N=Z is N(CH$_2$)$_6$]

A solution of 27.88 g. of 1-[N-(n-propyl)-4-chlorobenzimidoyl]hexamethylenimine in 150 ml. of concentrated sulfuric acid was cooled and 11 g. of potassium nitrate was added. The mixture was allowed to warm to room temperature and additional sulfuric acid was added until all solid dissolved. The reaction mixture was poured into one liter of ice and an excess of 35 percent sodium hydroxide. The product was extracted with ether and the ether extracts were dried and concentrated. The residue was treated with hydrogen chloride gas to give 1-[N-(n-propyl)-2-nitro-4-chlorobenzimidoyl]hexamethylenimine in the form of its hydrochloride salt, m.p. 181°–183° C. and 194°–196° C. (polymorphism), pale yellow platelets from ethyl acetate and acetone.

EXAMPLE C46

1-[N-(n-Propyl)-4-chlorobenzimidoyl]-4-oxohexamethylenimine [I; Ar is 4-ClC$_6$H$_4$, $n$ is 0, R is CH$_2$CH$_2$CHC3, N=Z is 4-oxohexamethylenimino]

A solution of 3.31 g. of 1-[N-(n-propyl)-4-chlorobenzimidoyl]-4-hydroxyhexamethylenimine (Example C44) in 10 ml. of acetone and 2 ml. of water was cooled in methylene dichloride-solid carbon dioxide bath. Four ml. of a solution prepared from 2.67 g. of chromic oxide in 10 ml. of water containing 2.3 ml. of sulfuric acid was chilled and added dropwise. The reaction mixture was stirred for 1 hour below 0° C. and then allowed to warm to room temperature. The water-soluble fraction of the reaction mixture was made basic with 10 percent sodium hydroxide. The product was extracted with ether and the ether extracts were dried and concentrated. The 1-[N-(n-propyl)-4-chlorobenzimidoyl]-4-oxohexamethylenimine thus obtained was isolated in the form of its p-toluenesulfonate salt, m.p. 161°–163° C., colorless blades from acetone-acetonitrile.

EXAMPLE C47

1-(N-Isopropyl-4-chlorobenzimidoyl)-4-hydroxyhexamethylenimine [I; Ar is 4-ClC$_6$H$_4$, $n$ is O, R is CH(CH$_3$)$_2$, N=Z is 4-hydroxyhexamethylenimino] was prepared from N-isopropyl-4-chlorobenzimidyl chloride (Example B23) and 4-hydroxyhexamethylenimine according to the procedure of Example C44, and was obtained in the form of its hydrochloride salt, m.p. 203.5°–205° C., colorless blades from acetonitrile-isopropyl alcohol.

EXAMPLE C48

1-(N-Isopropyl-4-chlorobenzimidoyl)-4,4-dimethylpiperidine [I; Ar is 4-ClC$_6$H$_4$, $n$ is 0, R is CH(CH$_3$)$_2$, N=Z is 4,4-dimethylpiperdino] was prepared from N-isopropyl-4-chlorobenzimidyl chloride (Example B23) and 4,4-dimethylpiperidine according to the procedure of Example C44, and was obtained in the form of its hydrochloride salt, m.p. 244°–246° C., colorless microplates from aqueous acetone.

Example C49

1-(N-Isopropyl-4-chlorophenylacetimidoyl)hexamethylenimine [I; Ar is 4-clC$_6$H$_4$, $n$ is 1, R is CH(CH$_3$)$_2$, N=Z is N(CH$_2$)$_6$]

A mixture of 20.1 g. of 1-(p-chlorophenylthioacetyl)-hexamethylenimine (Example A43), 20.35 g. of mercuric chloride, 250 ml. of isopropylamine and 500 ml. of methanol was stirred at room temperature for about 16 hours. The reaction mixture was treated with activated charcoal, filtered, and the filtrate concentrated to remove the solvent. The residue was treated with dilute sodium hydroxide and extracted with ether. The ether extracts were dried and concentrated to give 1-(N-isopropyl-4-chlorophenylacetimidoyl)hexamethylenimine, obtained also in the form of its cyclohexanesulfamate salt, m.p. 150°–152° C., colorless needles from acetonitrile-acetone.

EXAMPLE C50

1-[N-(n-Propyl)-4-chlorophenylacetimidoyl]hexamethylenimine [I; Ar is 4-ClC$_6$H$_4$, $n$ is 1, R is CH$_2$CH$_2$CH$_3$, N=Z is N(CH$_2$)$_6$] was prepared from 1-(p-chlorophenylthioacetyl)hexamethylenimine (Example A43) and n-propylamine according to the procedure of Example C49, and was obtained in the form of its hydrochloride salt, m.p. 190°–192° C., colorless needles from acetonitrile.

EXAMPLE C51

1-(N-Isopropyl-4-chlorobenzimidoyl)-4-acetoxyhexamethylenimine [I; Ar is 4-ClC$_6$H$_4$, $n$ is 0, R is CH(CH$_3$)$_2$, N=Z is 4-acetoxyhexamethylenimino].

A mixture of 39.9 g. of 1-(N-isopropyl-4-chlorobenzimidoyl)-4-hydroxyhexamethylenimine, 400 ml. of acetic anhydride and 200 ml. of pyridine was heated at reflux for about 6 hours. The reaction mixture was flash evaporated to a dark red oil which was made alkaline with dilute sodium hydroxide and extracted with chloroform. The chloroform extracts were washed with water, dried and concentrated to give 1-(N-isopropyl-4-chlorobenzimidoyl)-4-acetoxyhexamethylenimine, also obtained in the form of its cyclohexanesulfamate salt monohydrate, m.p. 152°–154° C., colorless crystals from acetone.

EXAMPLE C52

1-[N-(n-Propyl)-4-aminobenzimidoyl]hexamethylenimine [I; Ar is 4-H$_2$NC$_6$H$_4$, $n$ is O, R is CH$_2$CH$_2$CH$_3$, N=Z is N(CH$_2$)$_6$] was prepared by hydrogenation of 1-[N-(n-propyl)-4-nitrobenzimidoyl]hexamethylenimine (Example C28) in 300 ml. of methanol in the presence of 0.5 g. of platinum oxide catalyst. Reduction was complete in 10 minutes. The mixture was filtered and hydrogen chloride gas was passed through the filtrate. The solution was concentrated to remove the solvent, and the residue was recrystallized from ethanol to give 1-[N-(n-propyl)-4-aminobenzimidoyl]hexamethylenimine in the form of its dihydrochloride salt, yellow prisms, m.p. 218°–220° C.

EXAMPLE C53 a. 1-[N-(3-Chloropropyl)-4-chlorobenzimidoyl]hexamethylenimine [I; Ar is 4ClC$_6$H$_4$, $n$ is O, R is CH$_2$CH$_2$CHC2Cl, N=Z is N(CH$_2$)$_6$] from compound of Example B39 and hexamethylenimine), yellow oil.

b. 1-[N-(3-Acetoxypropyl)-4-chlorobenzimidoyl]hexamethylenimine]I; Ar is 4ClC$_6$H$_4$, $n$ is 0, R is CH$_2$CH$_2$CH$_2$OCOCH$_3$ N=Z is N(CH$_2$)$_6$] was prepared from 1-[N-(3-chloropropyl)-4chlorobenzimidoyl]e-hexamethylenimine and potassium acetate in dimethylformamide according to the procedure of Example C43(b). There was thus obtained 1-[N-(3-acetoxypropyl)-4-chlorobenzimidoyl]hexamethylenimine in the form of its p-toluenesulfonate salt, m.p. 144°–147° C., colorless prisms from ethyl acetate.

EXAMPLE C54

1-[N-(3-Hydroxypropyl)-4-chlorobenzimidoyl]hexamethylenimine [I; Ar is 4ClC$_6$H$_4$, $n$ is 0, R is CH$_2$CH$_2$Chc]2OH, N=Z is N(CH$_2$)$_6$]

A mixture of 31.4 g. of 1-[N-(3acetoxypropyl)-4-chlorobenzimidoyl]hexamethylenimine p-toluenesulfonate, 150 ml. of methanol and a few crystals of p-toluenesulfonic acid monohydrate was refluxed for one week. The reaction mixture was concentrated to remove the solvent, and the residue was triturated with ether and recrystallized from ether-acetone to give 1 - [N-(3-hydroxypropyl)-4-chlorobenzimidoyl[hexamet hylenimine in the form of colorless massive prisms, m.p. 129°–130° C.

EXAMPLE C55

1(N-Isopropyl-2,5-dichlorobenzimidoyl)hexamethylenimine [I; Ar is 2,5-Cl$_2$C$_6$H$_3$, $n$ is 0, R is CH(CH$_3$)$_2$, N=Z is N(CH$_2$)$_6$] (from compound of Example B40 and hexamethylenimine), hydrochloride salt, m.p. 184°–186° C., colorless prisms from acetone-ether.

EXAMPLE C56

1-(N-Isopropyl-3-nitro-4chlorobenzimidoyl)hexameth ylenimine [I; Ar is 3-O$_2$N-4-ClC$_6$H$_3$, $n$ is 0, R is CH(CH$_3$)$_2$, N=Z is N(CH$_2$)$_6$] (from compound of Example B41 and hexamethylenimine), p-toluenesulfonate salt, m.p. 205°–208° C., yellow prisms from acetone-ether.

EXAMPLE C57

1-[N-(n-Propyl)-3-nitrobenzimidoyl]hexameth ylenimine [I; Ar is 3-O$_2$NC$_6$H$_4$, $n$ is 0, R is CH$_2$CH$_2$CH$_3$, N=Z is N(CH$_2$)$_6$] (from compound of Example B42 and hexamethylenimine), cyclohexanesulfamate salt, m.p. 134°–136° C. (from acetone-ether).

I claim:

1. A compound of the formula

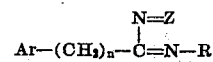

wherein Ar is unsubstituted pyridyl or phenyl substituted by from one to three substitutents selected from the group consisting of halogen, trifluoromethyl, trifluormethoxy, nitro, lower-alkyl, lower-alkoxy, lower-alkylthio, lower-alkylsulfoxy, lower-alkyl-sulfonyl and amino; $n$ is 0 or an integer from 1 to 3; N=Z is polymethylenimino having from five to nine ring members substituted on a ring carbon atom non-adjacent to nitrogen by hydroxy, lower-alkanoyloxy or oxo; and R is lower-alkyl, lower-alkenyl, cycloalkyl of 3–6 ring members, cycloalkyl-lower-alkyl wherein cycloalkyl has 3–6 ring members, phenyl-lower-alkyl, hydroxy-lower-alkyl or lower-alkanoyloxy-lower-alkyl.

2. 1(N-lower-alkyl-4-chlorobenzimidoyl)-4-piperidinol, according to claim 1 wherein Ar is p-chlorophenyl, $n$ is 0, N=Z is 4-hydoxy-1-piperidyl and R is lower-alkyl.

3. 1-(N-Lower-alkyl-4-chlorobenzimidoyl)-4-hydroxyhexamethylenimine, according to claim 1 wherein Ar is p-chlorophenyl, $n$ is 0, N=Z is 4-hydroxyhexamethylenimino and R is lower-alkyl.

4. 1(N-Lower-alkyl-4-chlorobenzimidoyl)-4-oxohexamethylenimine, according to claim 1 wherein AR is p-chlorophenyl, $n$ is 0, N=Z is 4-oxohexamethylenimino and R is lower-alkyl, 5. 1(N-Lower-alkyl-4chlorobenzimidoyl)-4-acetoxyhexamethylenimine, according to claim 1 wherein Ar is p-chlorophenyl, $n$ is 0, N=Z is 4-acetoxyhexamethylenimino and R is lower-alkyl.

* * * * *